United States Patent [19]

Sih

[11] Patent Number: 5,732,134
[45] Date of Patent: Mar. 24, 1998

[54] DOUBLETALK DETECTION BY MEANS OF SPECTRAL CONTENT

[75] Inventor: Gilbert C. Sih, San Diego, Calif.

[73] Assignee: Qualcomm Incorporated, San Diego, Calif.

[21] Appl. No.: 783,768

[22] Filed: Jan. 15, 1997

Related U.S. Application Data

[63] Continuation of Ser. No. 535,365, Sep. 28, 1995, abandoned, which is a continuation of Ser. No. 202,521, Feb. 28, 1994, abandoned.

[51] Int. Cl.$^6$ ............................. H04M 1/20; H04M 9/08
[52] U.S. Cl. ...................... 379/406; 379/389; 379/410
[58] Field of Search .................................. 379/351, 386, 379/389, 390, 406, 407, 408, 409, 410, 411

[56] References Cited

U.S. PATENT DOCUMENTS

| | | | |
|---|---|---|---|
| 4,712,235 | 12/1987 | Jones, Jr. ......................... | 379/410 |
| 4,903,247 | 2/1990 | Van Gerwen et al. ............. | 379/411 X |
| 5,014,263 | 5/1991 | Vairavan et al. ................... | 370/32.1 |
| 5,193,112 | 3/1993 | Sano ................................. | 379/410 |
| 5,263,019 | 11/1993 | Chu .................................. | 370/32.1 |
| 5,263,020 | 11/1993 | Yatsuzuka et al. ................ | 370/32.1 |
| 5,278,900 | 1/1994 | Van Gerwen et al. ............. | 379/410 |
| 5,343,521 | 8/1994 | Jullien et al. ..................... | 379/410 |

Primary Examiner—Harry S. Hong
Assistant Examiner—Scott L. Weaver
Attorney, Agent, or Firm—Russell B. Miller; Sean English; Linli L. Golden

[57] ABSTRACT

A method and apparatus are described for detecting doubletalk in an acoustic echo canceller. The present invention examines the spectral characteristic of the near-end audio signal and the spectral characteristics of the far-end audio signal and determines from the comparison if a condition of doubletalk exists. An exemplary implementaion of the present invention is presented in an acoustic echo canceller wherein the adaptation of the adaptive filter taps is inhibited during periods of doubletalk.

11 Claims, 2 Drawing Sheets

DOUBLETALK DETECTION BY MEANS OF SPECTRAL CONTENT

This is a Continuation of application Ser. No. 08/535,365, filed Sep. 28, 1995, now abandoned, which is a continuation of application Ser. No. 08/202,521, filed Feb. 28, 1994, now abandoned.

BACKGROUND OF THE INVENTION

I. Field of the Invention

The present invention relates to echo cancellation. More particularly, the present invention relates to a novel and improved method and apparatus for determining a doubletalk condition in an echo canceller.

II. Description of the Related Art

Acoustic echo-cancellers (AEC) are used in teleconferencing and hands-free telephony applications to eliminate acoustic feedback between a loudspeaker and a microphone. In a cellular telephone system where the driver uses a hands-free telephone, acoustic echo cancellers are used in the mobile station to provide full-duplex communications. A block diagram of a traditional acoustic echo canceller is illustrated in FIG. 1.

For reference purposes, the driver is the near-end talker with input speech signal v(n) and the person at the other end of the connection is the far-end talker with input digital speech signal x(n). The speech of the far-end talker is broadcast out of loudspeaker 2 in the mobile. If this speech is picked up by microphone 10, the far-end talker hears an annoying echo of his or her own voice. The output of microphone 10, r(n), is a digital signal. Typically the functions performed by microphone 10 may be accomplished by a microphone, which would convert the audio signal to an analog electrical signal and an analog to digital (A/D) converter. The AEC identifies the impulse response between speaker 2 and microphone 10, generates a replica of the echo using adaptive filter 14, and subtracts it in summer 12 from the microphone output, r(n), to cancel the far-end talker echo y(n). Since the adaptive filter cannot generally remove all of the echo, some form of echo suppression provided by residual echo suppression element 18 is typically employed to remove any residual echo.

In FIG. 1, the far end talker echo signal y(n) is illustrated as the output of an acoustic echo path element 4, which is an artifact of the proximity of the loudspeaker 2 and microphone 10. To the far end talker echo signal y(n) is added noise signal w(n) and near-end speech signal v(n), illustrated by summing elements 6 and 8 respectively. It should be noted that summing elements 6 and 8 and acoustic echo path 4 are artifacts of the mobile environment and are presented for illustrative purposes.

Since adaptive filter 14 uses the far-end speech x(n) as a reference signal, it cannot possibly cancel the near-end speech because in general, v(n) is uncorrelated with x(n). If adaptive filter 14 is allowed to adapt in the presence of v(n), the near-end speech will be added to the error signal e(n), which drives the filter tap coefficient adaptation, corrupting the estimate of acoustic echo path 4. It is therefore necessary to disable coefficient adaptation when both talkers are speaking, a condition referred to as doubletalk. During doubletalk, residual echo suppression element 18 must also be disabled to prevent corruption of the near-end speech. Doubletalk detector 16 detects the presence of doubletalk and provides control signals to adaptive filter 14 and residual echo suppression element 18 when double talk is present.

Doubletalk detection is the most critical element in any acoustic echo canceller. In contrast with network echo cancellers, which can monitor the fairly constant loss between x(n) and r(n) to gain information about whether near-end speech is present, acoustic echo cancellers do not have this property. Since the analog speaker volume control is under the control of the driver, the volume can be changed to any desired level at any time. The volume can even be shifted so high as to produce a gain between speaker and microphone. The microphone position may also change at any time.

Traditionally, doubletalk detection in acoustic environments is accomplished by monitoring the echo return loss enhancement (ERLE), which is defined as:

$$ERLE(\text{dB}) = 10 \cdot \log(\sigma_y^2/\sigma_e^2), \tag{1}$$

where $\sigma_y^2$ is the variance of the echo signal y(n) and $\sigma_e^2$ is the variance of the error e(n). The variances $\sigma_y^2$ and $\sigma_e^2$ are estimated using short-term energy measurements of r(n) and e(n) respectively. The ERLE measures how much energy is being removed in summing element 12. Classical doubletalk detectors declare that near-end speech is present if the ERLE falls below some preset threshold such as 3 or 6 dB.

This doubletalk detection method is highly unreliable, especially in high-noise environments, for several reasons. First, this method requires the adaptive filter 14 to be converged before the ERLE can provide any valid information. In a noisy environment like a car, adaptive filter 14 may not converge at all, or may converge extremely slowly, due to the noise and the long filter length required to model the acoustic channel. Second, the ERLE is highly variable because adaptive filter 14 can only approximate the echo channel due to the noise. The detection scheme therefore produces many false doubletalk detections. Third, a change in the impulse response of the echo path also produces a loss in ERLE. If people are moving within the mobile environment, or the microphone changes its position, the ERLE will drop, causing a false doubletalk detection.

SUMMARY OF THE INVENTION

The present invention is a novel and improved method and apparatus for detecting doubletalk. This newly proposed method for doubletalk detection measures and compares the spectral content of the far-end reference signal x(n) and the received signal r(n). The unknown acoustic echo channel is modeled as a linear time-invariant (LTI) system. Although the unknown channel may in actuality vary with time, it changes slowly enough that the adaptive algorithm is able to track it, therefore permitting use of this model. A useful property of LTI systems is that they do not create any new frequencies. That is, if the input to an LTI system consists of frequencies A, B, and C, the output of the system must contain scaled replicas of these 3 frequencies. No new frequencies may be present at the output if the system is linear.

Through the Fourier transform, both the far-end reference signal x(n) and the received signal r(n) can be represented as a sum of complex exponentials. Since the received echo signal at the microphone sounds like the original far-end signal, the frequency components that are large in the received signal must also have been large in the reference signal. If there are large peaks in the received signal that are not present in the reference signal, then these peaks were not caused by echo. Therefore, by comparing the frequency peaks between the reference and received signal, it can be determined whether near-end speech is present, even without knowledge of the unknown echo channel.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
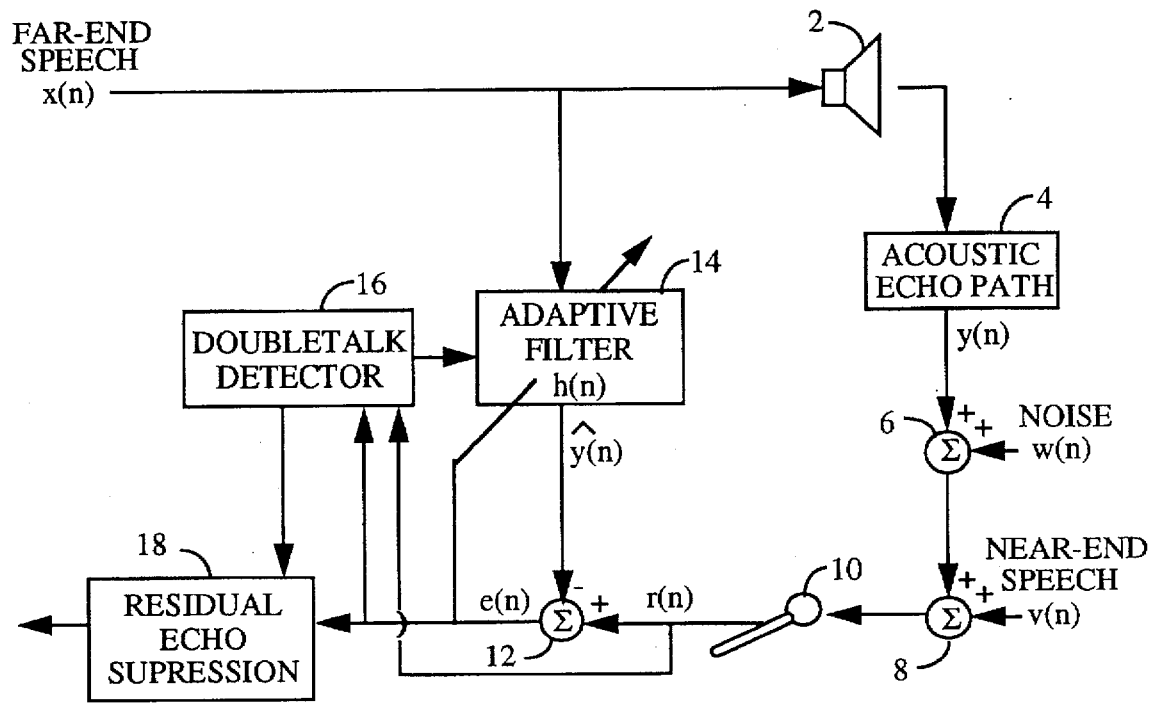
FIG. 1 is a block diagram of a traditional acoustic echo canceller.
Figure 2:
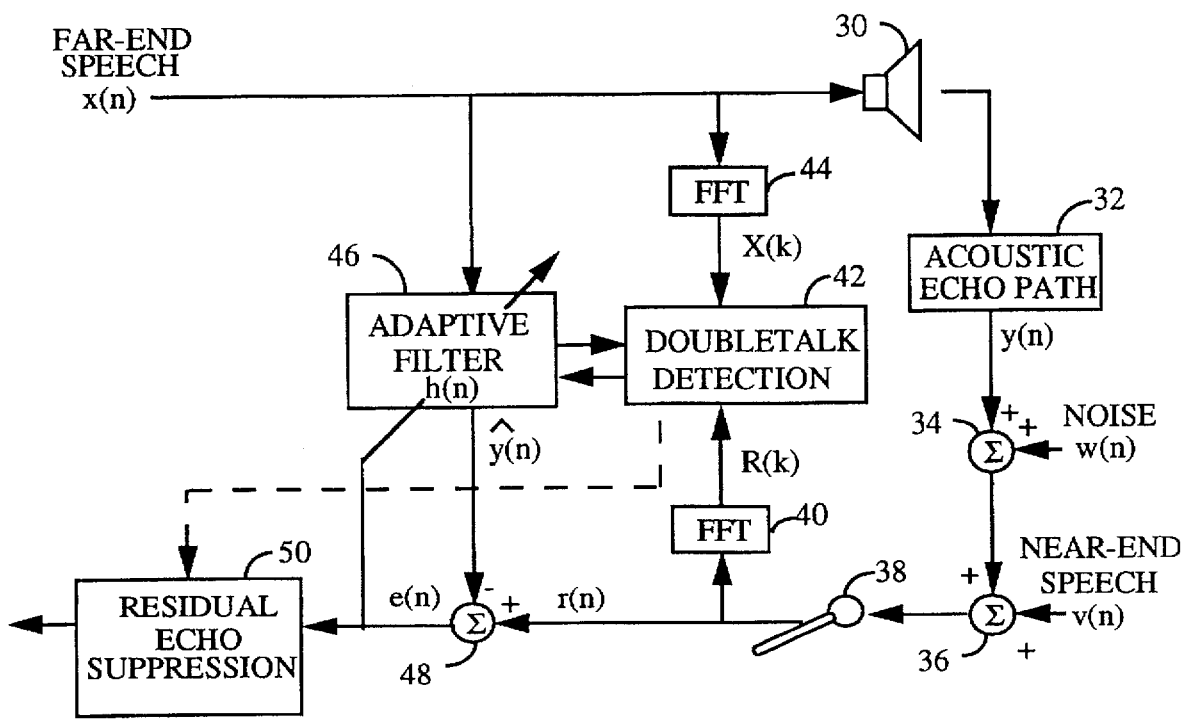
FIG. 2 is a block diagram of the acoustic echo canceller of the present invention.

Referring to FIG. 2, in the preferred embodiment, the frequency representations of x(n) and r(n) are obtained using the Fast Fourier Transform(FFT); a fast implementation of the Discrete Fourier Transform(DFT) the implementation of which is well known in the art. X(k) and R(k) are sets of frequency components of x(n) and r(n) respectively, where the lengths and frequency spacings of X(k) and R(k) are determined by the order of the transform.

The far-end speech signal x(n) is provided to loudspeaker 30 and FFT element 44. The far-end speech signal x(n), is broadcast out of loudspeaker 30 into acoustic echo path 32 which provides echo signal y(n). Noise signal w(n) and near-end speech signal v(n) are added to echo signal y(n) illustrated in summers 34 and 36 respectively. Again it should be noted that summers 34 and 36 and acoustic echo path 32 are artifacts of the mobile environment and are presented for illustrative purposes. The sum of echo signal y(n) noise signal w(n) and near-end speech signal v(n), is provided to microphone 38. The output of microphone 38 is r(n).

The far-end speech signal x(n) is provided to FFT element 44 which determines the frequency representation of the far-end speech signal, X(k). The output of microphone 38, r(n), is provided to FFT element 40 which determines the frequency representation of the microphone output, R(k). The frequency representations are provided to doubletalk detection element 42 which compares the two signals and determines if doubletalk is present. If doubletalk is determined to be present, then doubletalk detection element 42 provides a control signal to adaptive filter 46 to curtail adaptation of filter tap values. If doubletalk is determined to be present, then doubletalk detection element 42 also provides a control signal to residual echo suppression element 50 to curtail its operation.

Adaptive filter 46 estimates the echo signal in accordance with the far-end speech signal x(n) and the error signal e(n). The estimated echo signal ŷ(n) is subtracted from the output of microphone 38, r(n), in summer 48. The output of summer 48 is the error signal, e(n), which is provided to residual echo suppression element 50 where additional echo suppression takes place.

Figure 3:
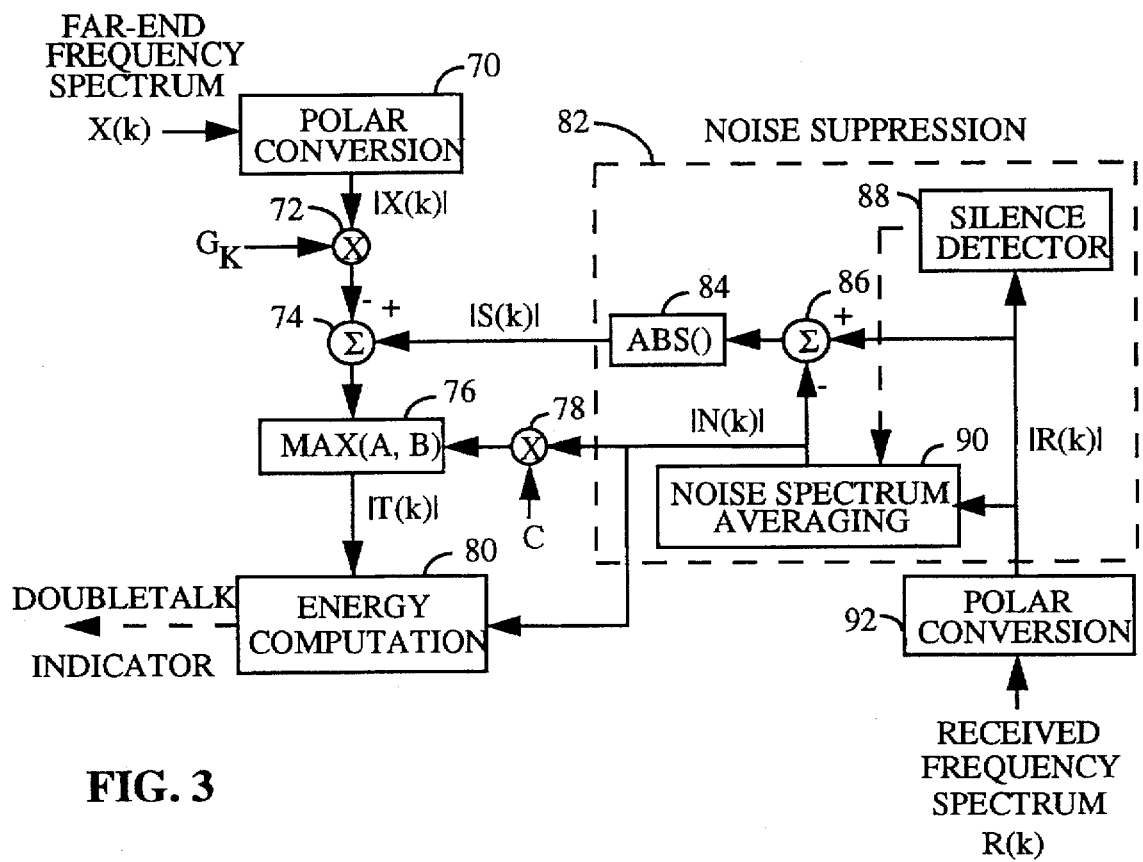
FIG. 3 is a block diagram of the doubletalk detection apparatus of the present invention.

In FIG. 3, doubletalk detection element 42 is shown in further detail. Doubletalk detection is performed in the frequency domain. The respective spectral components X(k) and R(k) are converted into polar form by polar conversion elements 70 and 92 respectively to obtain their respective magnitude components |X(k)| and |R(k)|. The received car noise is suppressed in noise suppression element 82 to prevent spurious noise frequency peaks from being interpreted as doubletalk.

In noise suppression element 82, the noise is suppressed by low-pass averaging of the noise spectrum in noise spectrum averaging element 90 during periods of silence. Periods of silence are detected by silence detector 88 which enables noise spectrum averaging element 90 during detected periods of silence. Noise spectrum averaging element 90 provides averaged noise magnitude spectrum |N(k)| to summer 86. In summer 86, the averaged noise magnitude spectrum |N(k)| is subtracted from the received magnitude spectrum |R(k)|. The absolute value of the difference is determined in magnitude element 84 to obtain the noise-suppressed received magnitude spectrum |S(k)|.

The magnitude components of the far-end speech spectrum |X(k)| are weighted in multiplier 72 by $G_k$, where $G_k$ is a frequency-dependent scalar that estimates the echo channel magnitude response for that frequency. The output of multiplier 72, $G_k|X(k)|$, is provided to summer 74 where it is subtracted from the noise-suppressed received magnitude spectrum |S(k)|. This difference is compared to the product of constant C (C<1) and |N(k)|, with the maximum of the two chosen to form magnitude spectrum |T(k)| in selection element 76. By using C*|N(k)| as a lower bound, it is ensured that each frequency component has a positive contribution toward |T(k)|. The energy of |T(k)| is computed in energy computation element 80 by Parseval's theorem, where N represents the order of the FFT:

$$E_T = \frac{1}{N} \sum_{k=0}^{N-1} |T(k)|^2 \qquad (2)$$

If this energy exceeds some predetermined threshold as compared with the average background noise energy, doubletalk is declared.

The coefficients $G_k$ can be computed by several means. If adaptive filter 46 has converged, they can be estimated by finding the magnitude spectrum of the impulse response of the adaptive filter. In a noisy situation where the filter has not converged, these coefficients can be approximated by time-averaging the quotient |S(k)|/|X(k)| for large components of X(k) when doubletalk is not declared. That is, for each frame of N samples corresponding to a set of N frequency components X(k), only estimates of $G_k$ for the largest frequency peaks in |X(k)| are updated and the other coefficients are left unchanged. This gives a more accurate estimate in the presence of noise. The method and apparatus described in the exemplary embodiment for the detection of doubletalk is equally applicable to the detection of near-end only speech and far-end only speech conditions.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. An apparatus for detecting doubletalk comprising:

a first transform element having an input for receiving a far-end signal and having an output;

a second transform element having an input for receiving a near-end signal and having an output, the near-end signal including an uncancelled echo component;

a detector having a first input coupled to said first transform element output and a second input coupled to said second transform element output for detecting a doubletalk condition in accordance with a signal provided by said first transform element and a signal provided by said second transform element; and an adaptive filter coupled to the detector, the adaptive filter configured for adapting filter tap values, all adapting of filter tap values being prevented when the detector detects a doubletalk condition.

2. An echo canceller comprising:

first transform means for receiving a far-end audio signal and transforming said far-end audio signal to a frequency representation of said far-end audio signal in accordance with a predetermined transform format;

second transform means for receiving a near-end audio signal including an uncancelled echo component and transforming said near-end audio signal including the uncancelled echo component to a frequency representation of said near-end audio signal in accordance with a predetermined second transform format;

detection means for receiving a first signal representative of said frequency representation of said far-end audio signal and a second signal representative of said frequency representation of said near-end audio signal and for comparing said first and second signals with each other and selectively providing a doubletalk signal in accordance with said comparison;

adaptive filter means for receiving said far-end audio signal and said doubletalk signal, for generating an estimated echo signal in accordance with said far-end audio signal and a set of adaptive filter parameters, and for adapting said set of adaptive filter parameters only when said doubletalk signal is absent; and echo removal means for receiving said near-end audio signal and said estimated echo signal and subtracting said estimated echo signal from said near-end audio signal.

3. The apparatus of claim 2 further comprising a residual echo suppression means for receiving an echo residual signal and suppressing remaining echo in said echo residual signal in accordance with an echo suppression format.

4. An apparatus for detecting doubletalk, comprising:

first transform means for receiving a far-end audio signal and for transforming said far-end audio signal to a far-end frequency representation of said far-end audio signal in accordance with a predetermined first transform format;

second transform means for receiving a near-end audio signal including an unremoved echo component and a noise component and for transforming said near-end audio signal to a near-end frequency representation of said near-end audio signal in accordance with a predetermined second transform format;

noise suppression means for receiving said near-end frequency representation and for generating a noise-suppressed near-end frequency representation in accordance with a predetermined noise suppression format; and detection means for receiving said far-end frequency representation and said noise-suppressed near-end frequency representation and for generating a signal indicative of a doubletalk condition in accordance with said far-end frequency representation and said noise-suppressed near-end frequency representation.

5. The apparatus of claim 4 wherein said detection means comprises:

subtraction means for subtracting said far-end frequency representation from said noise-suppressed near-end frequency representation to provide a difference signal;

energy computation means for determining an energy value of said difference signal in accordance with a predetermined energy computation format; and comparison means for comparing said difference signal energy value with the predetermined threshold value and for selectively providing a signal indicative of a doubletalk condition in accordance with said comparison.

6. The apparatus of claim 5 wherein said far-end frequency representation comprises frequency components, and wherein said detection means further comprises weighting means for weighting said frequency components of said far-end frequency representation.

7. The apparatus of claim 5 wherein said noise suppression means generates said noise-suppressed near-end frequency representation by generating a noise spectrum estimate of said noise component and subtracting said noise spectrum estimate from said near-end frequency representation.

8. A method for detecting the existence of a doubletalk condition wherein said doubletalk condition exists when both near-end and far-end audio signals are present, said near-end audio signal including an unremoved echo component and a noise component, comprising the steps of:

transforming said far-end audio signal to a frequency representation of said far-end audio signal in accordance with a predetermined first transform format;

transforming said near-end audio signal to a frequency representation of said near-end audio signal in accordance with a predetermined second transform format;

suppressing said noise component of said near-end frequency representation in accordance with a predetermined noise suppression format to generate a noise suppressed frequency format; and determining the presence of said doubletalk condition in accordance with said far-end frequency representation and said noise suppressed near-end frequency representation.

9. The method of claim 8 wherein said step of determining comprises the steps of:

subtracting said far-end frequency representation from said noise suppressed near-end frequency representation to provide a difference signal;

determining an energy value of said difference signal in accordance with a predetermined energy computation format; and comparing said difference signal energy value with a predetermined threshold value to selectively provide a signal indicative of said doubletalk condition.

10. The method of claim 9 wherein said far-end frequency representation comprises frequency components, further comprising the step of weighting said frequency components.

11. The method of claim 8 wherein said step of suppressing comprises the steps of:

generating a noise spectrum estimate; and subtracting said noise spectrum estimate from said near-end frequency representation.

* * * * *